United States Patent Office 3,445,990
Patented May 27, 1969

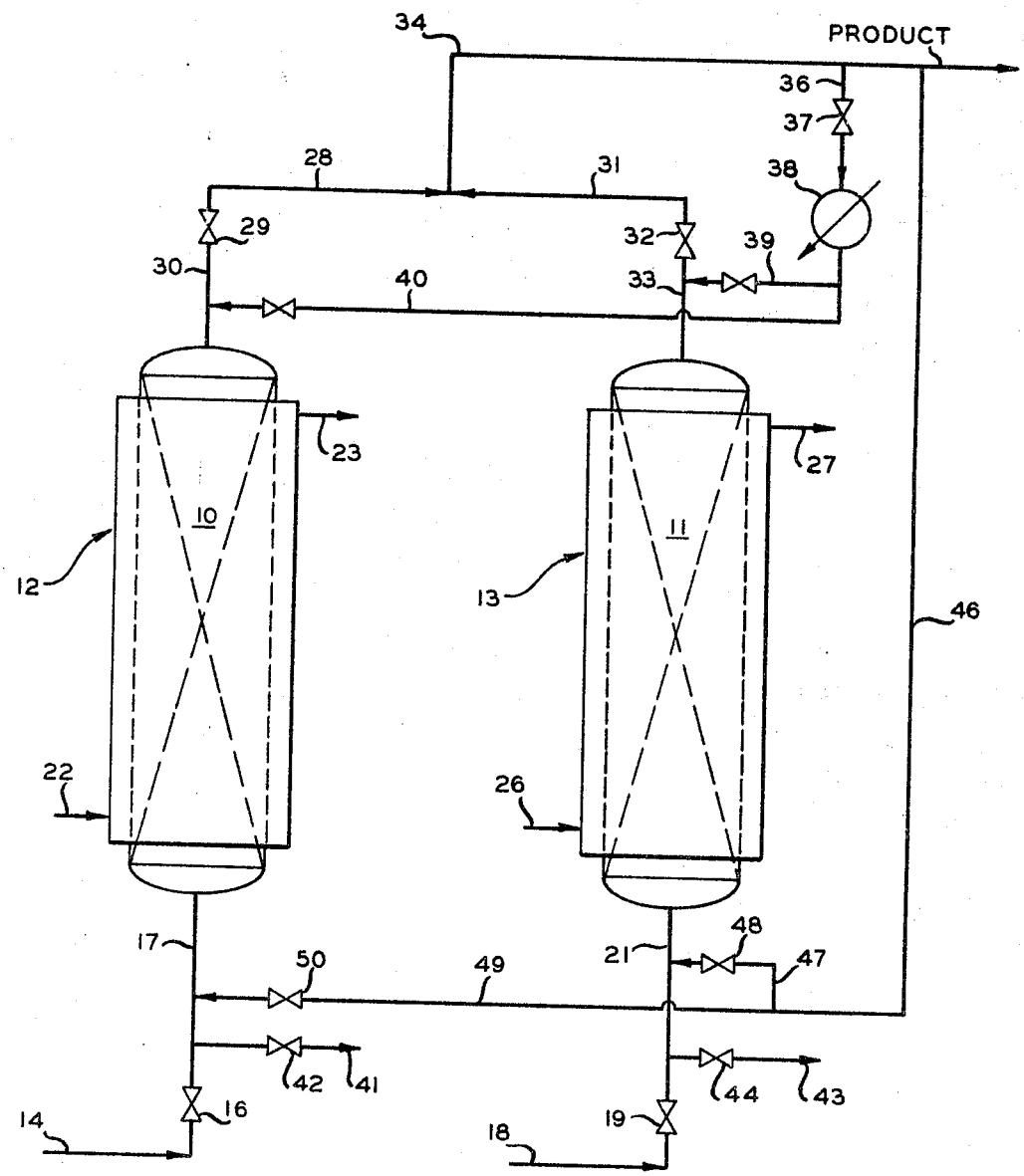

3,445,990
SEPARATION OF GASEOUS MIXTURES
George E. Hays and Forrest L. Poska, Bartlesville, Okla., assignors to Phillips Petroleum Company, a corporation of Delaware
Filed Apr. 10, 1967, Ser. No. 629,677
Int. Cl. B01d 53/04
U.S. Cl. 55—58   1 Claim

ABSTRACT OF THE DISCLOSURE

A cyclic method of separating one or more components from a gaseous mixture wherein at least two adsorption zones are utilized, the temperature of the beds during both adsorption and regeneration cycles being regulated by externally circulating a heat transfer media.

---

In one aspect this invention relates to separating one or more components from a gaseous mixture. In another aspect, this invention relates to a method of adsorbing impurities from a gaseous mixture.

In many industrial processes, oxygen- or nitrogen-rich air streams are necessary to the operation of the processes. In other processes, it is necessary to remove minor amounts of impurities from a gaseous mixture in order to obtain a commercially acceptable product. For example, in helium recovery processes it is often necessary to remove small concentrations of air or nitrogen from the final product stream.

Selective adsorption is a conventional method of removing a component, such as a minor impurity, from a gas stream. After a certain amount of adsorption, the adsorbent becomes "loaded" with the adsorbed component and no longer functions effectively. The adsorbent then must be regenerated by desorbing the adsorbed component. Known methods of adsorbent regeneration include pressure reduction and purging with a gas for which the adsorbent is not selective.

By the practice of the invention, wherein the temperature of the adsorbent bed is regulated, adsorption efficiency is increased and substantially all of the adsorbed component is desorbed in a relatively short time.

Accordingly, it is an object of this invention to separate one or more components from a gaseous mixture.

Another object of this invention is to remove low concentrations of impurities from a gas stream.

Another object of this invention is to provide an improved adsorption process for the production of a high purity gas.

Other objects and advantages of the invention will be apparent to one skilled in the art upon consideration of the following disclosure, drawing, and appended claim.

The drawing is a schematic illustration of the adsorption system utilized in the practice of the invention.

According to the invention, there is provided a method for separating one or more components from a gaseous mixture stream wherein at least two adsorption zones, each having an entrance and exit end, are utilized. The adsorbent in these zones is preferentially selective for one or more components to be removed from the gaseous mixture. The method comprises feeding the gaseous mixture stream at high pressure and low temperature in an adsorption cycle from the entrance end to the exit end of a first adsorbent zone which is relatively free of the component to be removed, externally cooling the first adsorbent zone during the adsorption cycle, discharging the gaseous mixture from the first zone as primary effluent, segregating and heating a portion of the primary effluent, recovering the remaining portion of primary effluent as product, regenerating a second adsorbent zone by externally heating and reducing the pressure in the second zone which is relatively saturated with the removed component to desorb a portion of the component from the second, thereafter purging the second bed of at least a part of the remaining removed component by passing the heated portion of the primary effluent in reverse flow from the exit end to the entrance end, externally cooling the second bed to the predetermined low adsorption temperature and repressuring the second bed to the predetermined high adsorption pressure with a portion of the primary product, and thereafter cyclically continuing the steps.

Further, in accordance with the invention the desorption and purging of the second bed is accomplished in less than 50 percent of the time required for completion of the adsorption stage in the first zone.

The separation process is cyclic in that while the first zone is on an adsorption stage, the second zone is regenerated, pressurized, cooled, to go on stream when the adsorbent in the first zone becomes relatively saturated with a predetermined amount of the removed component. The second zone is then switched over to the adsorption stage while the first zone is being regenerated and repressured.

The adsorption zones can comprise an adsorbent-packed vessel having an outer shell. Temperature in the adsorbent bed can be controlled to different levels during different steps of the process by circulating a heat transfer medium through the jacket formed by the vessel walls and the outer shell.

The adsorptive material employed is one which has an affinity for the component which is to be removed from the gaseous mixture, therefore the selection of an adsorbent is determined by the characteristics of the component to be removed and the characteristics of the other components in the mixture. If desired, the adsorption zone can be packed with a number of different adsorptive materials arranged in layers. Typical adsorbents available for use in the invention are activated carbon, alumina, silica gel, charcoal, bone char, and molecular sieve materials such as zeolites.

Referring now to the drawing, a first adsorbent bed 10 and a second adsorbent bed 11 are packed in vertical vessels 12 and 13 both of which are jacketed with outer shells. Feed conduit 14 having a valve 16 suppiles adsorbent bed 10 through entrance conduit 17; feed conduit 18 having a valve 19 supplies adsorbent bed 11 through entrance conduit 21. Both feed conduits originate at a gaseous mixture source not shown. Conduits 22 and 23 provide for the circulation of heat transfer medium through the jacket of vessel 12. Conduits 26 and 27 to and from vessel 13 function similarly.

Primary effluent conduit 28 having a valve 29 is connected to exit conduit 30 of vessel 12 and primary effluent conduit 31 having a valve 32 is connected to exit conduit 33 of vessel 13. Both conduits 28 and 31 are connected into product conduit 34. A conduit 36 having a valve 37 and a heat exchanger 38 connects the product conduit 34 to purge feed and repressuring line 39 and purge feed and repressuring line 40. Conduit 41 having a valve 42 connects with entrance conduit 17 of vessel 10 to provide for depressuring and purge effluent removal. Conduit 43 having valve 44 functions similarly for vessel 13. Conduit 46 connects with product conduit 34 to alternate repressuring conduit 47 having valve 48 and to alternate repressuring conduit 49 having valve 50. Flow through the valves is always in the direction of the arrows.

In practice of the invention, an impurities-containing gas stream flows at a predetermined high pressure and low temperature through feed conduit 14, valve 16, and entrance conduit 17 to adsorbent bed 10 in vessel 12. The feed stream passes upwardly through the adsorbent bed in an adsorption cycle. During the adsorption cycle the adsorbent bed is maintained at substantially the same pressure as the incoming stream. Coolant from conduit 22 is circulated through the jacket of vessel 12 and out conduit 23 to maintain the adsorbent bed at a predetermined low adsorption temperature. Primary effluent gas, from which the impurity has been removed, flows overhead through exit conduit 30, valve 29, and primary effluent conduit 28 to product conduit 34.

A portion of the primary effluent passes through line 36, and valve 37 to heat exchanger 38 wherein the effluent temperature is raised to a predetermined level.

At the start of the adsorption cycle in bed 10, regeneration of adsorption bed 11 is begun. This regeneration proceeds in three steps. Adsorbent bed 11 is at the same high pressure and low temperature as during the adsorption cycle. Pressure is reduced in bed 11 by passage of gases therein through conduit 21, valve 44, and conduit 43, desorbing a portion of the adsorbed component. Heating medium from conduit 26 is circulated through the jacket of vessel 13, maintaining the adsorbent bed at a predetermined increased temperature to facilitate desorption of the adsorbed components. Heated primary effluent is passed through purged feed conduit 39 and flows downwardly through adsorbent bed 11 to remove adsorbed components. The purge effluent is removed from adsorbent bed 11 via conduit 21, valve 44, and conduit 43 for further processing. When substantially all of the adsorbed components have been flushed from bed 11, the heating of the bed and flow of purge effluent is stopped and repressuring is begun.

The regenerated adsorbent bed is repressured with a portion of the cold primary effluent which is passed through conduit 36, conduit 37, and conduit 33 downwardly through the adsorbent. At the same time as repressuring is initiated, refrigerant is introduced into the jacket of vessel 13 to cool the bed and remove the heat of compression. If desired, the regenerated adsorbent bed can be repressured by passing primary effluent through conduit 46, conduit 47, and conduit 21 upwardly into the bed. Once the predetermined high pressure and low temperature are obtained in bed 11, the bed is ready for the next adsorption cycle.

When adsorbent bed 10 becomes loaded with the adsorbed component, the impurities-containing gas stream is switched over to conduit 18 and flows through valve 19 and conduit 21 to regenerated adsorbent bed 11. The above-described regeneration steps are then carried out on saturated adsorbent bed 10.

When nitrogen impurities are removed from helium by the practice of this invention, the predetermined low feed temperature is from −345° F. to −295° F. and the feed pressure is from 500 to 5000 p.s.i.a. During nitrogen adsorption the adsorbent bed is maintained from −345° F. to −295° F. During regeneration the pressure is reduced to from 1 to 75 p.s.i.a. and the purge stream and bed are heated to from 150° F. to −315° F. To conserve refrigeration during the regeneration steps, it is preferred to heat the purge stream and bed to from −200° F. to −280° F.

The following example will serve to illustrate a specific embodiment of the invention.

EXAMPLE

Two adsorbent beds in parallel, as illustrated in the drawing, each consisting of two sections in series (only one section in drawing) each section having an 8-inch inner diameter and a 20-foot length were utilized. The beds were packed with coconut charcoal, sized 6–8 mesh, to obtain a true void volume of about 80 percent. Each section was jacketed for heating and/or cooling depending upon the period of the cycle.

A gas stream containing 99.5 percent helium and 0.5 percent impurities, the major portion of which was nitrogen, was passed at −320° F. and 2765 p.s.i.a. upwardly through the first adsorbent bed at a rate of 18,000 s.c.f./hr. Liquid nitrogen was circulated through the jacket of the vessel containing the first adsorbent bed to remove the heat of adsorption and maintain the bed at about −320° F. Helium with a purity of 99.9975 mol percent was recovered overhead from the first adsorbent bed. Impurities were 0.0020 mol percent neon and up to 0.0005 mol percent nitrogen.

During adsorption, the second adsorbent bed was regenerated. The second adsorbent bed which had completed an adsorption cycle contained approximately 775 s.c.f. of adsorbed nitrogen, 18 s.c.f. of adsorbed hydrogen, and 8100 s.c.f. of helium contained in the voids of the bed. The lower quarter of the bed was saturated with about 350 cc. S.T.P. of nitrogen per gram of charcoal. The bed pressure was let down from 2765 p.s.i.a. to near atmospheric pressure over a 1-hour period. During pressure reduction, gaseous nitrogen at 80° F. was circulated through the jacket of the vessel to raise the bed temperature from −320° F. to −240° F. Upon depressuring and heating, the nitrogen loading in the saturated end of the bed dropped to about 210 cc. (S.T.P.) per gram of charcoal.

With the bed and contained gas at near atmospheric pressure and −240° F., the bed was purged for 4 hours with purified helium product at −240° F. The purged stream was passed downwardly through the adsorbent bed under approximately 2 atmospheres pressure at about 15 s.c.f.m. The bed was maintained at −240° F. by circulating nitrogen vapor through the jacket of the vessel. Upon completion of the purging step, the nitrogen loading in the lower section bed was reduced to about 0.11 cc. (S.T.P.) per gram of charcoal.

After purging, the bed was repressured from the top to 2765 p.s.i.a. with purified helium product at −320° F. During repressuring, liquid nitrogen was circulated through the vessel jacket to cool the bed to −320° F.

After 12 hours of adsorption, the charcoal at the outlet end of the first adsorbent bed had a loading of 40 cc. (S.T.P.) of nitrogen per gram of charcoal and the feed stream was switched over to the regenerated bed in order to maintain high purity in the product stream.

Thus, it can be seen that adsorption in the first bed produced a high purity helium product for a relatively long period of time and that substantially all the nitrogen was desorbed from the second bed in less than 75 percent of the adsorption cycle, by the practice of the invention.

Reasonable modification and variation are within the scope of this invention which defines a novel method of removing impurities from a gas stream.

That which is claimed is:

1. A method of separating nitrogen from a high purity gaseous helium stream utilizing first and second adsorbent zones containing charcoal as the adsorbent, each of which has an entrance end at the bottom thereof and an exit end at the top thereof, said process comprising the steps of:

flowing a feed stream of relatively high purity helium containing a small quantity of nitrogen at a pressure in the range of about 500–5000 p.s.i.a. upwardly from the entrance end to the exit end of said first adsorbent zone which is initially relatively free of nitrogen;

maintaining said first adsorption zone at a predetermined low temperature in the range of about −345° F. to −295° F. by indirect heat exchange with liquid nitrogen;

discharging substantially pure helium containing not more than about 0.0005 mol percent nitrogen from said first zone as a primary effluent;

segregating and heating a portion of said primary effluent;

recovering the remaining portion of said primary effluent as product;

heating said second adsorbent zone by indirect heat exchange with a heating fluid and reducing the pressure in said second zone to a predetermined low pressure in the range of about 1 to 75 p.s.i.a. to desorb nitrogen therefrom from the entrance end thereof;

thereafter purging said second zone of substantially all of the remaining adsorbed nitrogen by passing said heated portion of the primary effluent downwardly in reverse flow from the exit end to the entrance end of said second zone;

subsequently cooling said second zone to a predetermined low temperature in the range of about $-345°$ to $-245°$ F. by indirect heat exchange with liquid nitrogen;

flowing said feed stream of substantially pure helium into said second zone of adsorbent and discontinuing flow of said feed stream to said first zone of adosrbent and cyclically continuing the steps to utilize said first and second zones for adsorption followed by regeneration alternately.

References Cited
UNITED STATES PATENTS

| | | | |
|---|---|---|---|
| 2,642,153 | 6/1953 | Parks | 55—179 |
| 3,085,379 | 4/1963 | Kiyonaga et al. | 55—58 |
| 3,279,153 | 10/1966 | Basmadjian et al. | 55—66 |
| 3,343,916 | 9/1967 | Cahn et al. | 55—62 |

REUBEN FRIEDMAN, *Primary Examiner.*

CHARLES N. HART, *Assistant Examiner.*

U.S. Cl. X.R.

55—62, 66